United States Patent Office 3,632,797
Patented Jan. 4, 1972

3,632,797
PROCESS FOR THE PREPARATION OF
POLYIMIDES
Franklin Boardman, Englishtown, N.J., assignor to Union
Carbide Corporation, New York, N.Y.
No Drawing. Filed Nov. 26, 1968, Ser. No. 779,241
Int. Cl. C08g 20/20
U.S. Cl. 260—78 UA     7 Claims

ABSTRACT OF THE DISCLOSURE

Process for the preparation of polyimides from polymers containing a plurality of carboxy groups and/or anhydride groups which comprises treating said polymer with an amide, sulfonamide or phosphonamide at temperatures of from about 150° C. to about 250° C. Water may be added as a catalyst.

---

This invention relates to a process for the preparation of imides of polymers containing a plurality of carboxy groups, e.g., poly(acrylic acid), and/or anhydride groups, e.g., poly(maleic anhydride), and their derivatives.

It is known that aqueous poly(acrylic acid) or poly(methacrylic acid) may be reacted with ammonia, amines, urea, or guanidines to form their corresponding cyclic imides. The use of any one of the latter class of reactants presents several difficulties.

Ammonia and most amines are gases at 200°–250° C., the temperatures necessary for efficient conversion. Therefore, a closed high-pressure system must be employed to prevent escape of the gases. Urea sublimes at these temperatures. Not only will there be loss of urea in an open system, but the system will become plugged with deposits of solid urea leading to the build-up of explosive pressures inside the system. Guanidine and urea in the reaction system decompose to gases: carbon dioxide and ammonia. Thus all of the aforementioned nitrogeneous compounds used in the prior art require pressure systems for reaction.

Another drawback to the use of amines in their tendency to degrade poly(acrylic acid) at the eelvated temperatures necessary for imidization. Degradation is so rapid for poly(acrylic acid) that the reaction is of no value commercially. The present invention provides a process generally free of the aforementioned disadvantages.

In a broad aspect, the novel process involves the reaction of an amide, sulfonamide or phosphonamide with a polymer containing a plurality of carboxy groups and/or anhydride groups. The novel process can be illustrated by the following skeletal equations:

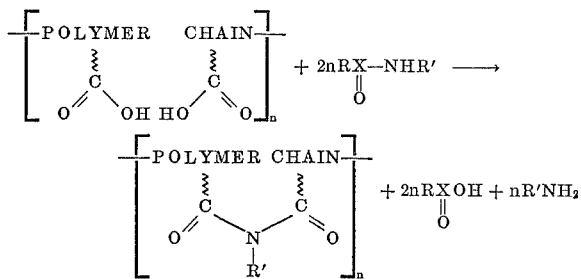

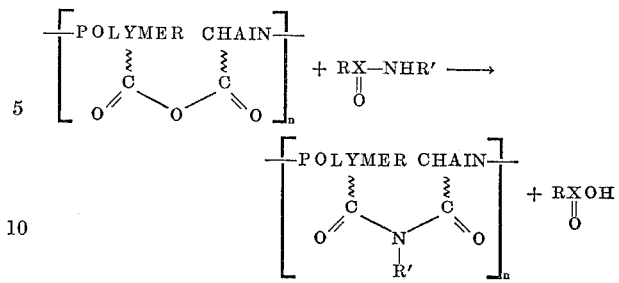

wherein the variables X, R, R' and $n$ are defined hereinafter.

The preferred class of polymeric starting materials is that in which the polymers contain carboxylic acid and/or anhydride groups pendant from the polymer chain and so positioned that they are capable of forming 5 to 8 membered, preferably 5 or 6 membered, cyclic imide units. That is, the preferred polymeric starting materials contain any one, or any combination of two, three etc. of the following kinds of units:

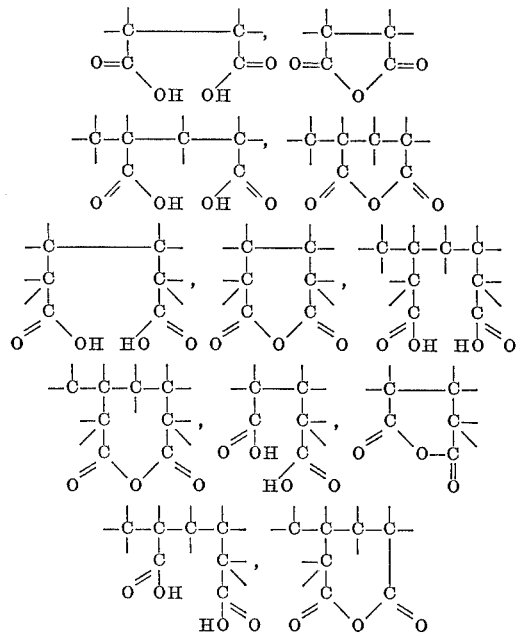

The polymeric starting material may be homopolymeric, e.g., composed essentially of either

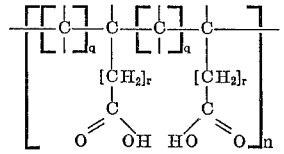

or valence bonds downward from the two carbon atoms which are shown as trivalent carbon atoms

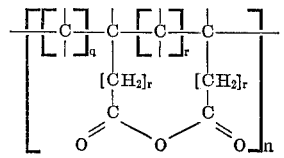

kinds of units in which $q$ and $r$ are independently either 0 or 1 and $n$ is the number of units in the polymer. The polymeric starting material may be a material which is copolymeric, terpolymeric, etc. and which has been produced by copolymerizing two or more unsaturated monomers each containing carboxylic acid or anhydride groups, through the unsaturation of the monomers. The polymeric starting material may also be a copolymer, terpolymer, etc. which has been produced by copolymerizing a monomer or monomers containing carboxylic acid and/or anhydride groups and ethylenic or acetylenic unsaturation, with a monomer or monomers also containing ethylenic or acetylenic unsaturation, but no carboxylic acid or anhydride groups, through the unsaturation of the two kinds of monomers. Such a starting material may be illustrated by the formulas:

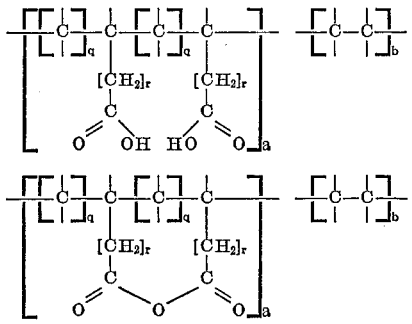

in which $q$ and $r$ are independently 0 or 1, and $a$ and $b$ are the mole percents of the two kinds of units in the copolymer.

Suitable homopolymeric starting materials may be depicted as having essentially the following unit structure:

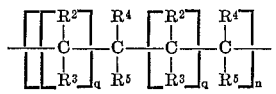

in which $R^2$ is hydrogen or a methyl, carboxyl or carboxymethyl group; $R^3$ is hydrogen or a carboxyl, saturated or unsaturated hydrocarbon group containing from 1 to about 6 carbon atoms, an acyl group containing from 1 to about 6 carbon atoms or a furanyl group; $R^4$ is hydrogen or a halo or a methyl, carboxyl, carboxymethyl or cyano group; $R^5$ is a carboxyl or carboxymethyl group; with the proviso that only one of the $R^2$, $R^3$ and $R^4$ kinds of groups represents a carboxyl or carboxymethyl group; or two $R^4$ or $R^5$ together can be a

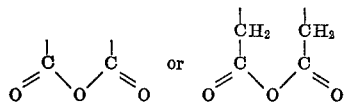

group; $q$ is either zero or 1; and $n$ is the number of units in the homopolymer.

Suitable copolymeric, terpolymeric, etc. starting materials may be depicted as having the following structure:

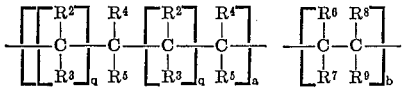

in which $R^2$, $R^3$, $R^4$, $R^5$ and $q$ have the meanings given above and may vary throughout the polymer; $R^6$, $R^7$, $R^8$ and $R^9$ are hydrogen, halo or hydrocarbon, hydrocarbyloxy or acyloxy groups containing from 1 to about 6 carbon atoms and may vary throughout the polymer; and $a$ and $b$ are the mole percents of the two kinds of units. If $R^2$, $R^3$, $R^4$, $R^5$ and/or $q$ varies, then the structure will still represent a copolymer even if $b$ is zero. The value of $b$, i.e., the mole percent of units not containing carboxylic acid or anhydride groups, can range up to values close to 100 percent. However, in order for the product polymer to substantially partake of the properties imparted by the plurality of imide groups, it is preferred that $b$ not exceed about 50 mole percent.

As long as the carboxylic acid or anhydride groups are pendant from the polymer chain and capable of forming 5 to 8 membered, preferably, 5 to 6 membered, cyclic imide units, the molecular weight or stereochemistry of the polymeric starting material is not critical. The polymer may be random (atactic) or stereoregular (isotactic or snydiotactic), in block form or crosslinked. However, it should be at least partially soluble in the other reactant, i.e., the amide, hosphonamide or sulfonamide, either alone or in conjunction with an inert, mutual solvent.

The polymeric starting materials for the novel process may be prepared by any known method of polymerization of unsaturated mono- or dicarboxylic acids or anhydrides. A general method for preparing these starting materials is that of utilizing ionic methods or ionizing radiation. Free radical initiation may also be used for preparation of poly(acrylic acid) or poly(methacrylic acid). For example, solutions of poly(acrylic acid) may be prepared by polymerizing acrylic acid in water or acetic acid in the presence of a free radical initiator. These solutions may be used without isolation of the polymer. Poly(acrylic acid) or poly(methacrylic acid) may also be produced by suspension polymerization of acrylic acid or methacrylic acid, respectively, in a hydrocarbon (aliphatic or aromatic); and the polymer may be used either in suspension with solvent or as a dry powder, free of solvent. Another method for producing poly(acrylic acid) or poly(methacrylic acid) is to hydrolyze the ester groups in a polyalkylacrylate or polyalkylmethacrylate. The anydride-containing polymers can be prepared by polymerizing a monomeric anhydride, e.g., maleic anhydride, or by dehydrating a polyacid by the methods generally used to produce anhydrides, e.g., by heating the polyacid with either acetic anhydride or acetyl chloride, as described on page 188 of Fieser and Fieser's Organic Chemistry, 3rd edition. Stereoregular polymers generally result from polymerizing monomers in the presence of an organometallic catalyst.

Suitable monomers which contain carboxylic acid or anhydride groups and which can be polymerized (by the aforementioned processes or other known processes) to form reactants for the novel process are those having the general formula:

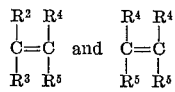

wherein $R^2$, $R^3$, $R^4$ and $R^5$ have the meanings given above.

Illustrative of such monomers are the following:

acrylic acid,
methacrylic acid,
maleic acid,
maleic anhydride,
fumaric acid,
citraconic acid,
itaconic acid,
sorbic acid,
2-cyanoacrylic acid,
2-chloroacrylic acid,
crotonic acid,
cinnamic acid,
β-benzoylacrylic acid,
2-furanacrylic acid,
ethylenemalonic acid,
vinylacetic acid,
dimethylmaleic acid,
crotonic acid,
isocrotonic acid,
mesaconic acid,
glutaconic acid,
allocinnamic acid,
angelic acid,
tiglic acid, acetylenedicarboxylic acid,
dibromomaleic,
dibromomaleic acid,
dibromofumaric acid,
bromofumaric acid,
chlorofumaric acid,
2-hexenoic acid,
their derivatives, and the like.

The anhydrides of the carboxylic acids in the foregoing list and the anhydrides of other similar carboxylic acids and their derivatives may also be used.

Examples of olefinically unsaturated monomers which can be copolymerized, terpolymerized, etc. with the foregoing illustrative carboxyl or anhydride containing monomers are the following:

ethylene
propylene
1-butene
2-butene
1-pentene
2,3-dimethyl-1-pentene
2,4-dimethyl-1-pentene
2-ethyl-1-pentene
2-methyl-1-pentene
4-methyl-1-pentene
2-pentene
2,3-dimethyl-2-pentene
3,4-dimethyl-2-pentene
3-ethyl-2-pentene
3-methyl-2-pentene
1-hexene
2-methyl-1-hexene
4-methyl-1-hexene
5-methyl-1-hexene
2-hexene
2-methyl-2-hexene
3-methyl-2-hexene
5-methyl-2-hexene
3-hexene
2-methyl-3-hexene
1-heptene
2-heptene
3-heptene
octene
cyclobutene
cyclopentene
cyclohexene
4-isopropyl-1-methyl-cyclohexene
3-isopropyl-6-methylene-cyclohexene
4-methyl-cyclohexene
styrene
vinylcyclohexane
vinylcyclohexene
vinyl methyl ether
vinyl ethyl ether
vinyl butyl ether
vinyl acetate
vinyl propionate
vinyl chloride and the like.

Other comonomers which may be used are:

allylmalonic acid,
propylidenemalonic acid,
hydromuconic acid,
pyrocinchonic acid,
allylsuccinic acid, and the like.

The polymeric starting materials may contain other substituents in lieu of or in addition to those indicated above so long as these other substituents do not interfere with imidization of the polymer.

The amide, sulfonamide or phosphonamide reactant for the novel process may be represented by the general formula:

$$R-\overset{\overset{\displaystyle O}{\|}}{X}-NHR^1$$

wherein R and $R^1$ may be hydrogen or a hydrocarbon substituent such as an alkyl; and X is a carbon, sulfur or phosphorous atom. Because of the present relative expensiveness of the phosphonamides and sulfonamides, the amides are preferred. Illustrative amides are formamide, acetamide, N-methyl acetamide, N-ethyl acetamide, N-phenyl acetamide, propionamide, n-butyramide, n-valeramide, and n-caproamide. Those amides which contain up to about six carbon atoms are preferred, and those which are relatively soluble in water are more preferred. Formamide, acetamide and their N-methyl, N-ethyl, N-t-butyl and N-phenyl derivatives are highly preferred. Formamide and acetamide are the most preferred reactants. However, under the reaction conditions hydrogen cyanide can be formed by dehydration of formamide. Hydrogen cyanide can then polymerize in the system.

Amides derived from hydroxy acids of sulfur and phosphorous in all of the valence states of these elements may also be used in this invention. Examples of structures of such amides are:

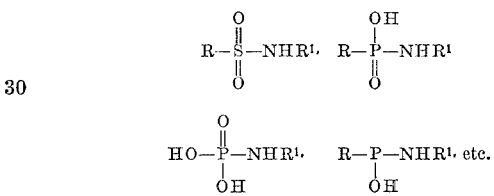

An inert, polar, mutual solvent may be additionally present in the system. Illustrative of such solvents are acetic acid, propionic acid, N-methylpyrrolidone, and the like.

For the sake of convenience, the usual reaction procedure will be described with poly(acrylic acid) and acetamide as illustrative reactants.

Poly(acrylic acid) is dissolved in acetamide. The concentration of the solution may be from about one percent poly(acrylic acid) in acetamide (on a weight basis) to a stoichiometric equivalence of acid to amide groups. However, excessive crosslinking or undesirable side reactions may occur at high concentrations. The preferred concentration is about one to about fifty percent (on a weight basis) of the poly(acrylic acid) in acetamide. More preferred is a concentration of about one to about twenty-five percent. Low concentrations are preferred to keep the viscosity of the polymer solution at a minimum. However, high concentrations may be used if equipment is available that will stir the highly viscous solutions resulting.

Water (in a concentration range of about one to about fifty percent, based on the weight of the reaction mixture) acts as a catalyst and can be added if not already present as solvent for the poly(acrylic acid). It is possible to substitute the ammonium salt of an acid for both the amide and water, since under the reaction conditions the salt will be converted to its corresponding amide and water. For example, ammonium acetate may be used in place of acetamide and water. If the poly(acrylic acid) is to be used as a solution in an acid (e.g., acetic acid), the addition of ammonia or ammonium hydroxide will suffice to produce an ammonium salt in situ.

The system described is heated to about 150° to about 250° C. for a period of time sufficient to convert at least some of the carboxyl and/or anhydride groups to imide groups, i.e., about one to about eight hours. (An inert atmosphere in the system is preferable, but not necessary.) Preferred is a temperature range of about 170° to about 190° C. over a time interval of about three to about five hours. Volatile compounds such as solvent, water and amine are allowed to distill from the system at atmospheric pressure. If desired, pressure equipment may be used and all compounds boiling lower than 190° C. may be kept in the system with no ill effects. The conversion of poly(acrylic acid) to polyacrylimide occurs at this stage and is evidenced by a lowering in viscosity of the reaction mixture. This lowering in viscosity is due to the disappearance of the electroviscous effect characteristic of solutions of poly(acrylic acid) in amide solvents, as the carboxyl groups of the polymers are converted to imide groups.

The product may be isolated by various means. For example, the cooled reaction mixture may be poured into a five to ten-fold excess of water. If the amide used in the reaction is not a liquid at room temperature (e.g., acetamide), then the reaction mixture should not be allowed to cool so far as to freeze before addition to water. Such freezing does not produce any chemical change in the product, but it does make the product more difficult to purify. At this point polyacrylimide is obtained as a yellow-to-white fibrous precipitate. If desired, the product may be further purified by washing with water, then washing with acetone, and finally air-drying the product at room temperature. Product yields are virtually quantitative. Other means of isolation, which will be obvious to those skilled in the art, can also be employed.

Products with solution inherent viscosities of about 0.3 to about 3.0 (0.2% solution in dimethylformamide) have generally been obtained. The process may be used to prepare products of higher or lower viscosity as well.

It appears that during the process amide groups are initially formed, and they then react to form the imide groups. For example, in the reaction of poly(acrylic acid) and acetamide, the following unbalanced sequence is believed to play a role in the process:

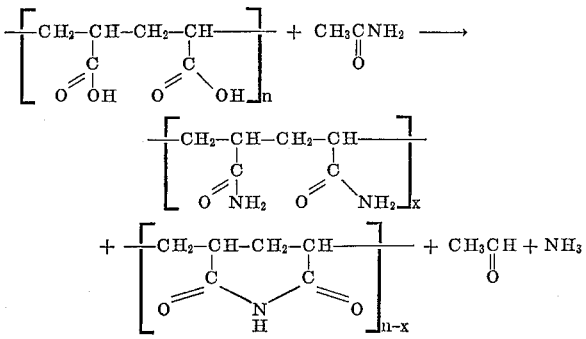

Under the reaction conditions, the conversion of polyacrylamide to polyacrylimide is so rapid that the former is not isolated.

The percent of imidization of the polymer may be determined in the laboratory by titration of unreacted carboxyl groups on the polymer chain with alkali. Solutions of the polymer in dimethylformamide can be easily titrated to sharp endpoints with aqueous sodium hydroxide and phenolphthalein indicator. Besides carboxyl and imide groups the polymer may contain amide groups. Infra-red spectra of different polymers indicate that the polymers generally contain only a few percent of amide groups. Therefore, the percent imide in the polymer can be safely estimated to be equal to 100 percent minus the percent acid groups determined by titration when the reaction has been conducted for a period of time sufficient to substantially convert the amide groups to imide groups.

The conversion of carboxyl groups to imide groups depends on the reaction time and the particular amide used as solvent. For example, when poly(acrylic acid) is treated with acetamide for three hours at 190° C., about 78% of the carboxyl groups undergo conversion to the imidized state; about 15% are converted to amide groups; and about 7% of the carboxyl groups remain in the free acid state. The use of N-ethylacetamide as reagent produces a polyimide in which about 12% of the acrylic carboxyl groups have not been reacted after 18 hours at 200° C. The use of N-ethylformamide for 2 hours at 200° C. produces a poly-N-ethylacrylimide in which about 35% of the carboxyl groups have not been imidized.

Because of the physical properties of the polyimides of this invention, it is believed that the imide groups are essentially present in the intramolecular, cyclic form indicated above. However, there may be some imide groups intermolecularly formed, thereby crosslinking polymer molecules.

Because of the generally high glass transition temperatures of polyimides (about 150° to 235° C.) these polymers are useful as components of glass reinforced thermoplastic laminates. The polyimides and N-methyl, N-t-butyl and N-phenyl polyimides derived from poly(acrylic acid), poly(methacrylic acid), poly(ethylene-maleic anhydride), and poly(styrene-maleic anhydride) are especially preferred. The polymers of the novel process, especially polyacrylimide and polymethacrylimide, also find utility as fibers and films.

In the following examples, which are illustrative of the novel process, all quantities are expressed as parts by weight.

EXAMPLE 1

Reaction of poly(acrylic acid) and acetamide

Dry nitrogen was passed through a four-necked flask equipped with stirrer, reflux condenser, gas inlet tube and thermometer. Into the flask was placed a solution of five parts of acetamide in ten parts of water. To the solution was added one part of poly(acrylic acid) having an inherent solution viscosity of 1.48 when dissolved at 0.1 percent concentration in p-dioxane. Rapid stirring was maintained until the poly(acrylic acid) had dissolved completely. A Dean-Stark trap was placed between the flask and reflux condenser. The temperature of the system was raised to 130° C., and water was distilled and collected in the Dean-Stark trap. When water had ceased to distill, the temperature was allowed to rise the 190° C. and was maintained at that level for three hours. Stirring and nitrogen flow were maintained during this period as well. Ammonia was evolved rapidly during the first hour at 190° C. As evolution of ammonia ceased, the viscosity of the solution decreased.

At the end of the three hour period, the temperature in the system was allowed to fall to 130° C. The clear yellow solution was poured slowly into one hundred parts of rapidly stirred water. Polyacrylimide separated as an off-white fibrous precipitate. The precipitate was washed with water, then acetone, and then air-dried overnight. A quantitative yield of product was obtained having an inherent solution viscosity of 2.9 in dimethylformamide at 0.2 percent concentration. The product polymer contained approximately 7% residual carboxyl groups, as determined by aqueous sodium hydroxide titration of a solution of the product in dimethylformamide. Approximately 15% of the carboxyl content of the starting polymer had been converted to amide groups. Therefore, approximately 78% of the carboxyl content of the starting polymer had been imidized. The glass transition temperature of the product polymer was 220° C.

EXAMPLE 2

Reaction of poly(acrylic acid) and formamide

A four-necked flask was equipped with stirrer, nitrogen gas, inlet tube, thermometer, and reflux condenser. Between the flask and condenser was placed a Dean-Stark trap, and on top of the condenser was placed a Dry Ice condenser. The flask was flushed with nitrogen. Into the flask was placed one hundred and eighteen parts of a ten percent solution of poly(acrylic acid) in water, followed by the addition of three hundred and ninety-five parts of formamide. The reactants were stirred vigorously at room temperature until a homogeneous solution was obtained. The temperature of the system was raised to 130° C., at which time water distilled into the Dean-Stark trap. The temperature was allowed to rise to 170° C., at which time ammonia and hydrogen cyanide were evolved. Both gases were returned to the flask by condensation in the Dry Ice trap. The hydrogen cyanide (formed by a side reaction, the dehydration of formamide) polymerized in the flask, causing the solution's color to turn from colorless to orange. The temperature of the system was kept at 185° C. for thirty minutes and then allowed to fall to room temperature. Polyacrylimide was precipitated by pouring the solution into three thousand nine hundred and fifty parts of water. The product was washed and dried as described in Example 1. A yield of ten parts of polyacrylimide was obtained, exhibiting an inherent solution viscosity of 0.74 in dimethylformamide at 0.2 percent concentration.

EXAMPLE 3

Reaction of poly(acrylic acid) and ammonium acetate

Into the reaction system described in Example 1 were placed two hundred parts of ammonium acetate. (No inert atmosphere was introduced into the system in this example.) The ammonium acetate was melted by heating the reactor flask to 114° C., at which time ten parts of poly(acrylic acid) having an inherent viscosity of 1.35 as a 0.2 percent solution in dioxane were added. The molten ammonium acetate was stirred at 114° C. until all of the poly(acrylic acid) dissolved. At this time the reaction temperature was raised to 210° C. Water distilled from the flask at this point and was collected in the Dean-Stark trap. After ninety minutes the temperature of the flask was allowed to fall to 100° C., and the solution was poured into one thousand parts of water. Polyacrylimide precipitated and was purified as described previously. A yield of eighty parts of polymer was obtained, exhibiting an inherent viscosity of 0.34 as a 0.2 percent solution in dimethylformamide.

EXAMPLE 4

"One step" preparation of polyacrylimide from acrylic acid monomer

Into the reaction system described in Example 1 were placed two hundred parts of acrylic acid monomer, seven hundred and eighty parts of benzene, and two thousand four hundred parts of glacial acetic acid. After purging the system with nitrogen, two parts of azo-bis(isobutyronitrile) were added and the reaction temperature raised to 80° C. After six hours the mixture of a white polymer suspended in acetic acid—benzene was cooled to room temperature and fifteen hundred parts of ammonium hydroxide (28 percent in water) were added cautiously to the reaction mixture. The ammonium hydroxide was added at such a rate as to effect controlled distillation of benzene into the Dean-Stark trap. When all of the ammonium hydroxide was added, heat was applied to the system, resulting in distillation of benzene and then water. The reaction system was ultimately heated to 190° C. for three hours, then cooled to 140° C., and the contents poured into ten thousand parts of water at room temperature. The polyacrylimide precipitated was washed and dried as described previously. A yield of one hundred and eighty parts was thus obtained.

EXAMPLE 5

Poly-N-methylacrylimide from N-methylformamide and poly(acrylic acid)

Into the reaction system described in Example 1 were placed twenty parts of poly(acrylic acid) having an inherent viscosity of 1.46 as a 0.2 percent solution in dioxane, one hundred parts of water, and two hundred parts of N-methylformamide. The reactants were stirred at 25° C. until complete solution was achieved. The reactants were heated (and stirred) under nitrogen at 130° C. for one hour to drive off water, and then heated (and stirred) under nitrogen for two and a half hours at 190° C. The colorless solution was poured into two thousand parts of water and poly-N-methyl-acrylimide precipitated. The polymer was purified in the same way as polyacrylimide. A yield of eighteen parts of polymer was obtained. The polymer exhibited an inherent viscosity of 1.2 as a 0.2 percent solution in dimethylformamide. The carboxyl content of the product was approximately 6% in the free acid state, 13.5% in the amidized state, and approximately 81% in the imidized state.

EXAMPLE 6

Poly-N-ethylacrylimide from N-ethyl acetamide and poly(acrylic acid)

Into the reaction system described in Example 1 were placed twenty parts of poly(acrylic acid) having an inherent viscosity of 0.78 as a 0.2 percent solution in dioxane, twenty-five parts of water, and two hundred parts of N-ethyl-acetamide. The reactants were stirred at 25° C. until complete solution was achieved. The reactants were heated (and stirred) under nitrogen for twenty hours at 200° C. The colorless solution was poured into two thousand parts of water and poly-N-ethylacrylimide precipitates. The polymer was purified by solution in 90 percent formic acid (at a concentration of 2 percent) and precipitation of the polymer as a powder by slowly pouring the solution into a fourfold excess of water.

The polymer exhibited an inherent viscosity of 0.82 as a 0.2 percent solution in dimethylformamide. The carboxyl content of the product was approximately 15% in the free acid state, 2% in the amidized state and approximately 88% in the imidized state. The glass transition temperature of the product was 159° C.

EXAMPLE 7

Poly-N-ethylacrylimide from poly(acrylic acid) and N-ethylformamide

Into the reaction system described in Example 1 were placed thirty parts of poly(acrylic acid) having an inherent viscosity of 0.78 as a 0.2 percent solution in dioxane, one hundred and fifty parts of N-ethylformamide and twenty-five parts of water. The reactants were stirred at 25° C. until complete solution was achieved. The reactants were heated (and stirred) under nitrogen for ninety minutes at 190° C., and the clear solution then poured into water. The precipitated polymer was purified in the same way as poly-N-ethylacrylimide prepared in Example 6. The polymer yield was twenty parts. The inherent viscosity of a 0.2 percent solution of the polymer in dimethylformamide was 2.5. The carboxyl content of the product was approximately 35% in the free acid state and assuming essentially complete imidization of the remainder, approximately 65% in the imidized state.

EXAMPLE 8

Poly(methacrylimide) from poly(methacrylic acid) and acetamide

Into the reaction system described in Example 1 were placed twenty parts of poly(methacrylic acid) two hundred parts of acetamide, and twent-five parts of water. The reactants were stirred for two hours under nitrogen in a bath at 150° C. The bath temperature was raised to 200° C. and the reactants were heated at that temperature for eighteen hours. The solution was then cooled to 140° C. and poured into water, precipitating poly (methacrylimide). The polymer was purified as described in Example 1.

The polymer yield was ten parts. The inherent viscosity of a 0.2 percent solution of the polymer in dimethylformamide was 1.7. A glass transition temperature of 220° C.

was obtained for the polymer. The carboxyl content of the product was approximately 12% in the free acid state and assuming complete imidization of the remainder, approximately 88% in the imidized state.

EXAMPLE 9

Isotactic poly(methacrylimide) from methyl methacrylate and formamide

Toluene (2170 parts) was added to a four-necked round bottom flask equipped with a mechanical stirrer, a thermometer, an addition funnel and an inlet and outlet tubes for nitrogen. One neck of the flask was covered with a rubber serum bottle cap. Methyl methacrylate (MMA), (264 parts) was placed in the funnel. $N_2$ was passed through the toluene and the monomer for one half hour. Butyllithium (264 parts) (22.9 weight percent solution in hexane) was added to the toluene. The flask was then placed into a Dry Ice-isopropanol bath. After the temperature of the toluene solution had dropped to $-70°$ C., MMA was added within 1 minute. The mixture was stirred for five hours. Methanol (240 parts) was added to the mixture at the end of the reaction, and the mixture was allowed to warm up to room temperature. It was then poured into more methanol, and the polymer precipitated was collected. It was washed first with a mixture of methanol and dilute hydrochloric acid, then with methanol-water, and finally with methanol. A white tough solid was obtained. Yield=241 parts (88.5 percent). The polymer had a reduced viscosity of 0.97 in 0.24 percent solution in dimethylformamide. Both infrared and differential thermal analysis of the polymer show that the polymer contains predominantly an isotactic structure. Imidization of isotactic polymethyl methacrylate: The above prepared isotactic poly(methyl methacrylate) (50 parts) was added to a mixture of sodium hydroxide (40 parts), water (50 parts) and isopropanol (800 parts). The mixture was refluxed on a steambath for 24 hours. The polymer was filtered and washed with isopropanol. It was then dissolved in water and the water solution of the polymer was acidified with dilute hydrochloric acid. The white polymer obtained was collected. A yield of 47 parts was obtained.

The hydrolyzed polymer was then added to a mixture of water and formamide. The mixture was heated at 70° C. until all of the polymer dissolved (1 hour). It was then heated to 130° C. and water distilled from the system. The temperature of the mixture was gradually raised to 195° C. When no more water distilled the reaction mixture was heated at 195° C. for another 45 minutes. After cooling, the mixture was poured into water. The polymer precipitate was collected. A yield of 240 parts was obtained. The polymer had a reduced viscosity of 0.75 in 0.2 percent dimethylformamide solution. Infrared scan of the polymer showed it to contain —NH and ester groups.

EXAMPLE 10

Poly(ethylene-maleimide) from poly(ethylenemaleic anhydride) and acetamide

In the reaction system described in Example 1 were placed twenty parts of EMA-31 (an ethylene-maleic anhydride copolymer containing 50 mole percent of each monomer and sold by Monsanto Company, St. Louis, Mo.), and one hundred parts of acetamide. The reactants were stirred at 100° C. until complete solution was achieved. The reactants were then heated and stirred at 190° C. for three hours. The solution was then cooled to 140° C. and poured into water, precipitating the desired product. The precipitated polymer was purified in the same way as poly-N-ethyl acrylimide prepared in Example 6. The polymer yield was eleven parts. The inherent viscosity of a 0.2 percent solution of the polymer in dimethylformamide is 0.29, and approximately 88 percent of the anhydride units were converted to imide units. A glass transition temperature of 220° C. was obtained for the polymer.

What is claimed is:

1. A process for the preparation of a polyimide of a thermoplastic polymer of an olefinically unsaturated monomer containing carboxylic acid or carboxylic acid anhydride groups said polymer containing said acid or anhydride groups pendant from the polymer chain and so positioned that said carboxylic or carboxylic acid anhydride groups are capable of forming 5 to 8 membered cyclic imide units which comprises:

(a) dissolving said thermoplastic polymer in an amide reactant represented by the general formula:

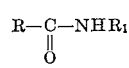

wherein each of R and $R_1$ is a monovalent radical selected from the group consisting of hydrogen or hydrocarbon groups containing 1 to about 6 carbon atoms, whereby the concentration of the solution of thermoplastic polymer in amide is from about 1 to about 50% on a weight basis;

(b) heating said solution at a temperature of from about 150° to 250° C. for a period of time sufficient to substantially imidize the thermoplastic polymer; and (c) isolating the product polyimide.

2. The process of claim 1 wherein the polymer concentration is in the range of about one to about twenty-five percent.

3. The process of claim 1 wherein the amide is formamide, acetamide, or their N-methyl, N-ethyl, N-t-butyl or N-phenyl derivatives.

4. The process of claim 1 wherein water is added as a catalyst.

5. The process of claim 4 wherein the water is present in a concentration of from about one to about fifty percent based on the total weight of the reaction mixture.

6. The process of claim 1 wherein the temperature is in the range of from about 170° C. to about 190° C.

7. The process of claim 1 wherein the product is isolated by admixing the reaction mixture with water and thereby precipitating the product.

References Cited

UNITED STATES PATENTS

| 2,146,209 | 2/1939 | Graves | 260—2 |
| 3,376,260 | 4/1968 | Fritz | 260—78 |
| 3,436,372 | 4/1969 | Hoegger | 260—78 |

HAROLD D. ANDERSON, Primary Examiner

U.S. Cl. X.R.

260—65 R, 96 R